United States Patent
Harrison (10) Patent No.: US 9,053,198 B2
(45) Date of Patent: Jun. 9, 2015

(54) SYSTEMS AND METHODS FOR THE CREATION, TRANSMISSION AND STORAGE OF INFORMATION AND SUBSEQUENT RETRIEVAL BY A USER

(71) Applicant: Paul W. Harrison, Los Angeles, CA (US)

(72) Inventor: Paul W. Harrison, Los Angeles, CA (US)

( * ) Notice: Subject to any disclaimer, the term of this patent is extended or adjusted under 35 U.S.C. 154(b) by 0 days.

(21) Appl. No.: 13/998,654

(22) Filed: Nov. 20, 2013

(65) Prior Publication Data

US 2014/0299662 A1    Oct. 9, 2014

Related U.S. Application Data

(60) Provisional application No. 61/796,780, filed on Nov. 20, 2012.

(51) Int. Cl.
 *G06K 5/00* (2006.01)
 *G06F 17/30* (2006.01)
 *B23K 26/20* (2014.01)

(52) U.S. Cl.
 CPC .......... *G06F 17/30879* (2013.01); *B23K 26/20* (2013.01)

(58) Field of Classification Search
 USPC ............ 235/462.44, 462.45, 472.01, 472.02, 235/472.03, 380
 IPC .................. G07F 7/1008; G06Q 20/341; G06K 7/10891, 7/70881, 7/10851, 17/0022, 7/10772
 See application file for complete search history.

(56) References Cited

U.S. PATENT DOCUMENTS

| | | | |
|---|---|---|---|
| 5,729,741 A | 3/1998 | Liaguno | |
| 6,075,223 A | 6/2000 | Harrison | |
| 6,313,436 B1 | 11/2001 | Harrison | |
| 6,340,978 B1 | 1/2002 | Mindrum | |
| 7,222,120 B1 | 5/2007 | Mindrum | |
| 7,254,666 B2 | 8/2007 | Toothman | |
| 7,287,225 B2 | 10/2007 | Mindrum | |
| 7,395,960 B1 | 7/2008 | Toothman | |
| 7,624,344 B2 | 11/2009 | Mindrum | |

(Continued)

OTHER PUBLICATIONS

"Mark-it"TM Laser marking pigment, BASF The Chemical company BASF Corporation, 100 Campus Drive, Florham Park, NJ 07932 (undated).

(Continued)

*Primary Examiner* — Karl D Frech
(74) *Attorney, Agent, or Firm* — James K. Poole, Esq.

(57) ABSTRACT

Systems and methods for the creation, transmission and storage of information related to a specific person, animal, place or object and subsequent retrieval of information by a user positioned at remote locations are disclosed. The systems and methods comprise information; data input computer equipment, an operating system, software and methods for the electronic recording, scanning or creation of information; a remote electronic memory storage facility or capability, commonly known as "cloud computing and/or storage"; unique infographic symbols and a mobile computing device equipped with a camera capable of retrieving information via a communications link to the Internet and displaying the information at a remote location. The infographic symbol can be a QR code or other code laser bonded to the surface of a substrate.

26 Claims, 8 Drawing Sheets

(56) References Cited

U.S. PATENT DOCUMENTS

| | | |
|---|---|---|
| 7,671,902 B2 | 3/2010 | Mindrum |
| 7,712,670 B2* | 5/2010 | Sauerwein et al. ...... 235/472.02 |
| 7,984,380 B2 | 7/2011 | Mindrum |
| 8,234,251 B2 | 7/2012 | Mindrum |
| 2011/0040798 A1 | 2/2011 | Tobacman et al. |
| 2011/0114728 A1* | 5/2011 | Chernyakov et al. ......... 235/454 |
| 2011/0209205 A1 | 8/2011 | Luke et al. |
| 2014/0117076 A1* | 5/2014 | Eberlein ...................... 235/375 |

OTHER PUBLICATIONS

Marking Tests to Certify Part ID Marking Processes for Use in Low Earth Orbit (2005) "Review Draft" by Donald L. Roxby, Siemens Symbology Research Ctr., Huntsville, AL 38505.

Vesnovsky, Oleg, "Preliminary Investigation of InfoGlyph Encoded mark," Technical Report, FDA/CDRH/DSFM, 4 pages (undated).

Harrison, Paul W. Results of burr Tag Tests at Corpus Christi Army Depot (CCAD), 3 page Report, Laser Bonding Technology, Los angeles, CA (undated).

* cited by examiner

FIG. 1

2 A
Advance Directive Template Document

2 B
Advance Directive ID Card

2 C
Adhesive Label

SYSTEMS AND METHODS FOR THE CREATION, TRANSMISSION AND STORAGE OF INFORMATION AND SUBSEQUENT RETRIEVAL BY A USER

CROSS REFERENCE TO RELATED APPLICATIONS

This application claims priority from provisional application U.S. Ser. No. 60/796,780, filed Nov. 20, 2012.

FIELD OF THE INVENTION

The present invention relates to the use of laser bonding methods to permanently inscribe codes (such as QR codes) readable by mobile reading devices such as cellular telephones for use in conjunction with systems for the creation, transmission and storage of information for subsequent retrieval by a user of a mobile reading device.

BACKGROUND OF THE INVENTION

There are many websites and social networks such as Facebook, Twitter, Google and YouTube for sharing certain types of information publicly, but these social network sites are not suited for the secure creation, storage, retrieval, transmission and display of private, copyrighted and/or confidential information which may be needed, on very short notice, in a critical or emergency situation. Individuals are now increasingly requesting to be more active participants in the preparation, ownership, storage and retrieval of their own important documents with regard to legal, financial and healthcare determinations and decisions as well as important public information not otherwise easily available.

ICE is the internationally recognized acronym for In Case of Emergency. There is a significant market opportunity in the preparation, storage and retrieval of Advance Directives containing critical healthcare related information necessary to first responders and other healthcare professionals in emergency or life threatening situations.

The most serious and time sensitive occasions for use of the proprietary Storage Software as a Service (SSaaS) system technology would be quickly obtaining the medical information and/or Advance Directive and making it easily available to first responders and other healthcare professionals in a life threatening situation. According to the Institute of Medicine (IOM), approximately 1.5 million medication errors occur annually. As a result, people suffer injury or death from mostly preventable prescription mistakes made by doctors, pharmacists, nurses and other healthcare professionals tasked with prescribing or dispensing medical drugs. Once the patient has been admitted to a recognized hospital or other healthcare facility, more comprehensive medical information can be accessed in accordance with government and healthcare industry regulations. In 2000, the IOM called for a major national effort to reduce medical errors by 50 percent within 5 years, but progress since then has fallen far short of expectations. Many patients continue to fear, justifiably, that they may be harmed when receiving medical treatment—even at a reputable healthcare facility.

The greatest concerns in providing this information via the SSaaS system technology are how to:

a. Develop a means to permanently and uniquely identify each individual person with a single methodology which provides a secure and easily accessible communications link to the remotely stored medical and/or advanced directive information b. Maintain material integrity and reduce the risk of damage associated with other methods of permanently integrating infographics for unique identification purposes c. Develop means to automatically scan the infographics in order to retrieve the remotely stored medical and/or advanced directive information d. Make the information secure and easily updatable via an accessible communications link e. Eliminate human error—to insure accuracy, security and timeliness in the retrieval of the remotely stored information Traditionally, healthcare information and other important documents have been written and stored on hard copy files and/or in electronic archives in one or more different locations. Such storage and retrieval facilities have been marketed by various companies such as Microsoft Health Vault, Google Health, Amazon, Apple and Iron Mountain, as well as major banks and financial institutions, among others, who have relied on their formidable business history and reputation in order to convince and assure potential customers of the long term safety and integrity of their healthcare information and/ or other documents. All of this may be true, but these systems are antiquated and usually require the entry of protected user and password identification, which is not always readily available to gain access to the information in an emergency or life threatening situation. In many cases such situations could cause costly, if not catastrophic, delays in receiving proper medical treatment.

Until now these storage and retrieval capabilities have generally been considered adequate; however, in light of modern day technology, personal mobility and travel preferences, their shortcomings have become quite evident. The available information is not always up-to-date, medically accurate or easily accessible and it is now apparent that a critical need exists for a storage and retrieval system that will enable relatives, legal representatives, beneficiaries, first responders and other healthcare professionals to have a rapid and simple means of retrieving individual patient information in emergency situations. In particular, there is an urgent need for remote access to storage and retrieval systems capable of providing individual Advance Directives containing critical healthcare information that will be in compliance with various government and industry rules and regulations such as HIPAA and HITECH, while still being readily available and useful in the analysis and determination of treatment options for individual patients in critical situations. It would also be beneficial for such a database storage and retrieval system to be easily accessible by patients and healthcare providers alike for the purpose of updating the information, and that such information be made available in a form that facilitates quick and easy dissemination and presentation when required.

The Patient Self-Determination Act (PSDA) is a federal law enacted in 1991 which requires all healthcare providers certified by Medicare and/or Medicaid to inform all adult patients about their rights to accept or refuse medical or surgical treatment and the right to execute an Advance Directive and provide information and assistance in its preparation. An Advance Directive is a written instruction similar to a living will or durable power of attorney for healthcare issues, which is recognized under the laws of all fifty states, relating to the provision of healthcare services when an individual is incapacitated.

A number of different government agencies and industry groups have joined to address the issues related to the creation, ownership, storage, security and dissemination of medical information; however, the various approaches taken have not always been well coordinated and are difficult to access quickly in an emergency situation. The driving forces behind these healthcare initiatives include the need for rapid response in emergency situations, the rising costs of healthcare services, the need for productivity gains and price reductions, government and industry compliance, as well as technological innovations, product liability concerns and customer demand. According to George Hill, an analyst at Leerink Swann, a healthcare investment bank, the market for medical data storage and retrieval systems was between $8 and $10 billion in 2009, the latest year for which such figures are available. The market size is expected to grow dramatically as new government and industry rules and regulations are integrated.

An Advance Directive is a document written before the onset of serious illness, that describes how the subject wants to live life, in one's own words and on one's own terms and/or names someone to make those choices if the subject becomes unable to make informed decisions. All fifty states legally recognize some form of Advance Directive, and SSaaS system technology can be tailored to allow each person to create a document that conforms to the requirements of that individual's state. The majority of states have reciprocity provisions. Even in those states that do not explicitly address the issue, there is a common law and constitutional right to accept or refuse medical treatment that may be broader than the rights identified under the state law. Because an Advance Directive is an expression of one's intent regarding medical treatment, it will influence that healthcare even if a particular instruction might not be enforceable under some circumstances.

Many people struggle to understand the complex legal language and terms typically used in these documents to express how they want their healthcare handled if they become very ill and unable to make those decisions on their own. This may account for the very low rate of completion of Advance Directives among the elderly and the general population at large. SSaaS system technology can be used to make the creation of such documents very simple, since it can be based on images and graphics that most people already understand. When presented in formats which are intuitive, visually and graphically interesting, multi-lingual, easy-to-create and easy-to-understand; it can potentially be used by every adult American regardless of race, religion or national origin— with or without personal assistance.

Typically, people are reluctant to consider their medical choices and decisions; but questions regarding healthcare treatment at the end-of-life are of great concern today, partly because of the increasing ability of medical technology to prolong life and partly because of highly publicized cases, like those of Karen Ann Quinlan and Terri Schiavo, involving comatose patients whose families wanted to withdraw medical treatment. Most people would like to avoid extending personal and family suffering by artificial means if they are in a vegetative state or when there is no hope of recovery. The best way for an individual to retain control in such a situation is to record their preferences for healthcare treatment and share their decisions with their loved ones, family members, physician and clergyman.

SSaaS system technology can be based on well established and readily available hardware and software such as the equipment and technology used for automated check-out at Home Depot, Office Depot and many other large retailers, as well as online document creation and storage product offerings such as Dropbox®, DocuSign (both in San Francisco, Calif.) and EasyIDCard® of Lindenhurst, N.Y. These different components can be combined to provide improved techniques for the creation and rapid retrieval of information at remote locations. Embodiments disclosed herein can utilize an electronic memory storage network, via cloud computing capability, containing the medical information and/or Advanced Directives related to specific users; a permanent infographic symbol providing a link to said medical information and/or Advanced Directive, using portable electronic imaging/reading devices such as smart phones, iPads or other mobile computing devices separate from the memory storage network and accessible via cloud computing capability utilizing a cellular telephone network, wireless computer network or near field communications network capable of retrieving and transmitting the information from the memory storage network via cloud computing capability to an individual situated at the remote location. The systems may further comprise portable electronic imaging/reading devices containing a GPS transmitter/receiver at the remote location such that the GPS coordinates of the remote location are determined and communicated to the electronic memory storage network via cloud computing capability. Once the information has been accessed, a series of email, text and/or telephonic messages can be sent to individuals, relatives and/or legal representatives based on instructions specified in the stored medical information and/or Advance Directives.

The "Memory Medallion" company holds U.S. Pat. Nos. 7,254,666 and 7,395,960, which disclose and claim methods of producing metal medallions with QR codes inscribed thereon. The medallions can be affixed to solid substrates such as tombstones to assist in the retrieval of information about the deceased occupants of the graves. Another company, Making Everlasting Memories, LLC (owned or controlled by SCI) owns a large number of patents and applications concerned with such technology. A representative example, U.S. Pat. No. 8,234,251 B2, discloses a system and method for archiving records; however, a need persists for systems with an easy to use, template based, GUI which can enable a user to easily scan, create and store information in a cloud storage facility or capability, via the Internet, about a person, animal, place, object or the like and associating such information with a unique infographic symbol such as a QR code. The information could be easily accessed, retrieved, displayed or printed by any Internet connected computer or other previously described mobile computing device.

Finally, U.S. Pat. No. 5,729,741, assigned to "Golden Enterprises," discloses systems and methods for the storage and retrieval of media information. A need persists for systems which can enable a user of a mobile computing device such as a smart phone to retrieve information about a place, deceased person or the like by using an infographic symbol such as a QR code to access stored information via the Internet. Where such codes are used outdoors and must last for years while exposed to the elements, as on a tombstone, there is a need for marking such codes on substrates in ways which will not allow them to be removed or to deteriorate under ambient conditions.

SUMMARY

The present invention seeks to provide sophisticated and/or secure environments for the preparation, ownership, storage, transmission, retrieval and display of such important documents and information.

Systems and methods of utilizing interactive computer systems for the creation, transmission and storage of information related, to a specific person, animal, place, thing, object or groups thereof and the subsequent retrieval of said information by a user or groups thereof positioned at remote locations are disclosed. The system comprises the information related to the specific person, animal, thing, object or groups thereof;

the computer equipment, operating system, software and method for the electronic recording and creation of said information and/or scanning of documents containing said information; a remote electronic memory storage facility or capability, commonly referred to as "cloud storage and/or computing"; and a portable communications device equipped with a camera such as a smart phone, iPad, tablet computer or other mobile computing device, separate from the electronic memory storage facility or capability, that is capable of retrieving the information related to said specific person, animal, place, thing, object or groups thereof, from the electronic memory storage facility or capability via a suitable communications link such as a cellular telephone network, wireless computer network or near field communications network or combination thereof; and displaying said information to a user or groups thereof positioned at a remote location. The system further comprises a database wherein the information residing on the remote electronic memory storage facility or capability is replicated in multiple additional locations utilizing state-of-the art encryption, data security and synchronization such as the products and services offered by Carbonite, Inc. of Boston, Mass.; Dropbox, Inc. of San Francisco; IDrive, Inc. of Calabasas, Calif. and Acronis Int'l GmbH of Woburn, Mass., among many others. The database can be accessed by a user of the system utilizing a portable communications device equipped with a camera such as a smart phone, iPad, tablet computer or other mobile computing device by capturing an image of a permanent indicia such as a QR Code, Data Matrix or Microsoft Tag® or other such infographic symbol, extracting its contents and transmitting the information contained therein via a suitable and available communications link such as a cellular telephone network, wireless computer network or near field communications network or combination thereof. The system may also comprise a GPS transponder incorporated within the portable communications device positioned at the user's remote location such that the GPS coordinates of the remote location are determined by the portable communications device and communicated to the database located on the remote electronic memory storage facility or capability via the established communications link for subsequent display.

The present invention relates generally to the electronic creation, transmission, storage and subsequent retrieval and display of information, and more specifically to interactive computer system databases and methods for the creation, transmission, storage and subsequent retrieval and display of information by a user or groups thereof, which may be positioned at remote locations.

According to Plunkett Research, Ltd., there were an estimated 5.5 billion global cellular communications subscriptions at the end of 2011, including more than 300 million in the U.S. alone. The wireless world incorporates a great deal more than smart phones, iPads and tablet computers; it also comprises products and services ranging from satellite-based networks and Wi-Fi hotspots to remote wireless sensor networks and vast wireless Wi-Fi networks on corporate and college campuses. Whether it is access through the fast data transfer of near field communications; Bluetooth; ultrawideband networks; satellite networks; cellular telephone networks or Wi-Fi; consumers and business users alike are becoming more and more reliant on wireless based services and devices in their daily tasks. There is no end in sight to the rapid proliferation and utilization of various types of existing, new and evolving wireless communications.

The lack of electrical power outlets and wired computer or telephone jacks is common at many remote locations. This would be particularly true in the case of a medical emergency at a remote location; at a cemetery or other memorial location; at a museum or exhibition hall; at a local, state or national park; at a zoo, wild animal park, amusement park or aquarium; and at most culturally or historically significant structures or landmarks in urban, suburban, rural or remote locations. Consequently, it is difficult to place comprehensive and specific information related to people, animals, things, objects or places in close proximity to these remote locations and also have the ability to easily revise or update such information once so placed.

Regardless of the remote location, any permanent indicia located at and integrated into the remote location must be able to indefinitely endure the weather conditions likely to be encountered and to withstand any attempt to remove it to the extent that the indicia is at least as durable and permanent as the substrate material onto which it has been laser inscribed, marked or bonded in a contrasting color so that it is readily visible and easily captured, imaged and decoded by the mobile computing device.

The laser inscribing, marking or bonding process can be accomplished utilizing any one of many commercially available marking systems currently in the marketplace, some of which are self contained and portable. such as provided by Synrad, Inc. of Mukilteo, Wash.; Epilog Laser Systems of Golden, Colo.; Trotec, GmbH of Wels, Austria; and Universal Laser Systems, Inc. of Scottsdale, Ariz.; among other manufacturers of such products. Many substrate materials will naturally produce permanent, high contrast, high resolution data, images and indicia, which are visible on their surface, when exposed to the energy of the marking system; while other substrates will require the addition of laser bonding materials such as those produced by TherMark Holdings, Inc. of Irvine, Calif.; Ferro Corporation of Cleveland, Ohio; and Laser Bonding Tech, Inc. of Ontario, Canada, among other manufacturers and suppliers, in order to produce permanent, high contrast, high resolution data, images and indicia visible on their surface when exposed to the laser energy of the marking system. Other substrate materials may require the inclusion of laser pigment additives such as Mark It™ (BASF, Ludwigshafen, Germany), Lazerflair® or Micabs® (both from Merck KGaA of Darmstadt, Germany) among others, in order to facilitate the laser inscribing or marking of permanent, high contrast, high resolution data, images and indicia visible on their surfaces.

The mobile computing device equipped with a camera such as a smart phone, iPad, tablet computer or other device should further comprise infographic symbol decoding and display software capability provided by companies such as ScanLife, Inc. of New York City or UpCode, Ltd. Of London, England, among others, which is capable of quickly decoding the infographic symbol and transmitting said data via the established communications link in order to access the information contained on the remote electronic memory storage facility or capability and subsequently displaying said information, utilizing the system's user friendly graphical interface in an easily readable format, to a person or group thereof positioned at a remote location.

In one embodiment, systems and methods for the creation, transmission and storage of information related to specific persons, animals, places, things, objects or groups thereof and the subsequent retrieval of said information by a user or groups thereof positioned at remote locations, comprise a. an interactive computer, monitor with camera, microphone and operating system connected to the Internet;

b. a remote electronic memory storage facility or capability;

c. a smart phone, iPad® or other mobile computing device with camera;

d software capable of decoding an imaged QR code or other infographic symbol;

e. a communications link such as a cellular telephone network, wireless computer network or near field communications network or combination thereof;

f. a laser marking system capable of inscribing, marking or bonding a permanent QR code or other infographic symbol on a variety of different materials;

g. a graphical user interface in an easily readable format to be displayed by said computer; and h. a document scanner, document printer and/or ID card printer.

In a variation of this system, the laser marking system is capable of the placement of inscribed, marked or bonded permanent indicia directly on the surface of a tombstone, grave marker, mausoleum, cremation urn or other memorial object made from natural or engineered stone, metal, composite, glass and/or ceramic materials used to commemorate the life and death of a loved one or a beloved pet.

In another aspect of the system and method described above, the capture of an image of the permanent indicia by a mobile computing device would enable the viewing of a live video feed or a digital audio, video and/or photographic presentation related to the specific person or pet comprising related dates and places of birth and death as well as other genealogy and lifetime achievement information.

In another embodiment of the system and method described above, the capture of an image of the permanent indicia would enable the viewing of a live video feed or a digital audio, video and/or photographic presentation related to the public transportation system or other services within a specific village, town or city.

An embodiment of a system for the creation, transmission and storage of information and the subsequent retrieval of the information by a user comprises components:

a. an interactive computer device with an operating system, software adapted to perform functions comprising the creation and storage of information and at least one input system, connected to the Internet;

b. an electronic memory storage facility or capability;

c an electronic communications link with the memory storage; and d. an infographic symbol permanently inscribed on a substrate surface.

This system can further comprise a mobile computing device with a camera adapted for imaging infographic symbols and including software enabling the device to decode the infographic symbol from the image thereof. This device can be a smart phone, tablet computer or other mobile computing device adapted to establish a wireless communication link. In operation, the decoded infographic symbol and installed software direct the mobile computing device to initiate a connection to a URL via the communications link to access and retrieve information from memory storage. The infographic symbol can be decoded by the operating system and installed software to cause the computing device to initiate a connection with the information using the decoded URL directed to the memory storage via the electronic communication link. The mobile computing device should have a graphical user interface (GUI) for displaying information retrieved from memory storage in a user selected format. The interactive computer device can be adapted to provide pre-programmed templates for the input of information. The memory storage can be located at a site remote from the system and its users.

The infographic symbol can be permanently inscribed on the surface of a substrate by laser bonding technology, and can be a bar code, data matrix code, QR code or other machine readable one dimensional or two dimensional unique identification code. The laser bonding process can be conducted using bonding compositions comprising glass frits, mixed metal oxides or pigments or mixtures thereof. Other usable bonding compositions include polyester resins, copolymers of styrene and acrylates or other monomers, pigments or combinations thereof.

The substrates used for inscribing the infographic symbols can include materials such as natural or engineered stone, metals, plastics, polymeric composites, glasses and ceramic materials. The objects can be tombstones or other memorials to deceased persons, with an infographic symbol (a bar code or QR code) laser bonded onto the surface of the object and the information accessed via the URL identification and other information related to at least one deceased person or animal associated with the monument.

Similar bar codes or QR codes can be laser bonded or printed onto the surface of an ID card and/or adhesive label, with the stored information accessed via the URL comprising advance directives, health information and the like regarding a specific living person associated with the information. The infographic symbols can be inscribed into an ID card and/or adhesive label using at least one laser pigment additive A method embodiment is provided for retrieving information about a person, animal, object or place by a user with a mobile computing device with a camera adapted to image and decode an infographic symbol permanently inscribed on the surface of a substrate related to the person, animal, etc., causing the computing device to transmit a signal via a wireless electronic communication link using the unique URL associated with information stored in an electronic memory storage facility, resulting in the display of at least a portion of the information on the GUI of the computing device Another method embodiment for storing information about a person, animal, etc. comprises loading the information into a memory storage facility associated with an interactive computer connected with the Internet, designating a URL uniquely associated with that information and permanently inscribing an infographic symbol onto the surface of a substrate associated with the same person, animal, etc., wherein the infographic symbol can be imaged and decoded by using a mobile computing device with a camera adapted to initiate a signal over an electronic communication link to access the URL and information associated therewith.

The use of laser bonding technology to permanently inscribe infographic symbols onto the surface of an object can be regarded as an improvement over prior art systems for transmitting, storing and retrieving information, particularly when the symbols are exposed to the elements or other adverse environments. Depending upon the material of the substrate, various laser bonding compositions and pigments listed above can be used in the laser bonding or inscribing process.

A particular method embodiment for the creation, transmission and storage of medical information about at least one living person comprises steps of first, providing a system having components:

a. an interactive computer device with an operating system, software adapted to perform functions comprising the creation and storage of said information and at least one input system, connected to the Internet;

b. at least one laser printer and at least one monitor associated with said interactive computer device;

c. an electronic memory storage facility or capability;

d. an electronic communications link with said memory storage, and then entering said medical information into said computer device via said input system; internally generating medical documents for each said person, including said advance directive and suitable information release, and retaining all information and documents in a designated file for each person;

generating a unique infographic symbol associated with each person and laser printing the infographic symbol, along with suitable personal information, on at least one ID card and at least one adhesive label; wherein, the infographic symbol enables a user with a mobile computing device with a camera adapted for imaging and software adapted for decoding the imaged infographic symbol, the computing device being further adapted to establish a wireless communications link and initiate a connection to a URL associated with the memory storage to retrieve information for at least one of the persons, then e. laser print the infographic symbol and suitable personal information on at least one ID card and at least one adhesive label;

f. print copies of the advance directives, medical releases and other requested medical information generated, and g. optionally, display the retrieved information on the computer monitor.

The ID cards can be made of durable plastics or flexible metal materials, with QR codes and other required information inscribed thereon by laser printing, laser inscribing or laser bonding, respectively.

BRIEF DESCRIPTION OF DRAWINGS

A clear understanding of the key features of the invention summarized above may be had by reference to the following description, including the appended claims, and the following drawings, which illustrate the methods and systems of the invention, although it will be understood that such drawings depict a variety of preferred embodiments of the invention and, therefore, are not to be considered as limiting its scope with regard to other embodiments which the invention is capable of contemplating. In these drawings, like reference numerals and characters designate corresponding parts and components in the different views of the same units or systems. Accordingly:

Before explaining the disclosed embodiments in detail, it is to be understood that the invention is not limited in its application to the details for the particular arrangements shown, since other embodiments are possible. Also, the terminology used herein is for the purpose of description and should not be considered as limiting.

DETAILED DESCRIPTION OF PREFERRED EMBODIMENTS

In the following description, contemporary terms are used for devices which represent apparatus having certain capabilities which may be duplicated or presented in improved and/or updated form in subsequent versions of such devices or different devices which provide the same capabilities. For example, the functions of a "smart phone" such as the iPhone produced by Apple Computer company can be provided (along with other functions) by a small portable computer such as an iPad®, also produced by Apple. Similarly, electronic devices comprising microprocessors and other computer components can be provided with executable programs, commonly referred to as software (or in the case of smart phones, computer applications or "apps") to enable them to perform certain functions when actuated by an operator/user or by signals containing commands, queries or the like from another device. In this description, the condensed expression "and/or" is used in the conventional sense, in which "A and/or B" means that A, B or A+B may be present.

Definitions for some terminology used in the present application are provided below. Descriptions for materials and methods for laser bonding technology can be found in Applicant's U.S. Pat. Nos. 6,075,223 and 6,313,436, both of which are incorporated herein by reference.

Infographic Symbols

Infographic symbols are graphic visual representations of information, data or knowledge intended to present complex information quickly and clearly. They can rapidly improve cognition by utilizing the human brain's visual ability to see patterns and trends or machine vision's ability to image and decode information contained within infographic symbols such as barcodes, Data Matrix codes or QR codes; among many other machine readable infographic symbols. The most recognizable machine readable infographic symbol is the UPC barcode that is required to be on all types of commodity products sold through retail distribution in the US. It is most commonly used in grocery stores and other retail outlets in conjunction with scanners at the check-out station. This is a one dimensional barcode which may be scanned or imaged, as opposed to the QR code or Data Matrix code which are two dimensional codes and must be imaged in order to be decoded. Two dimensional codes are capable of containing considerably more information than one dimensional codes, in the same 2D spatial area.

Graphical User Interface

The graphical user interface (GUI), (sometimes pronounced 'gooey') is a type of computer user interface that allows users to interact with various types of computers, smart phones and other electronic devices through graphical icons and visual indicators, as opposed to text-based interfaces, typed command labels or text navigation. GUIs were introduced in reaction to the perceived difficulty and steep learning curve of computer command-line interfaces which require commands to be typed on the keyboard. The actions in a GUI are usually performed through direct manipulation of the graphical elements. In addition to computers, GUIs can be found in hand-held devices such as smart phones, MP3 players, portable media players, gaming devices, household appliances, and office and industrial equipment.

Cloud Computing and Storage

Cloud computing and storage is a general term for anything that involves delivering hosted services over the Internet. The name cloud computing was inspired by the cloud symbol that is often used to represent the Internet in diagrams. A cloud computing and storage service has three distinct characteristics that differentiate it from traditional hosting. It is sold on demand, typically by the amount of storage required in Megabytes (Mb) or computing services required; it is elastic—a user can have as much or as little of the service as they want at any given time; and the service is fully managed by the provider. The user needs nothing more than a computer, smart phone, tablet or other mobile computing device and Internet access. Cloud storage is an information storage service model in which data is maintained, managed and backed up remotely and made available to users over a network communication link, typically the Internet, with integrated software for uploading, formatting, editing, accessing and presenting the data.

There are three main types of cloud storage models:

a. Public cloud storage services, such as Facebook, YouTube and Amazon's Simple Storage Service which provide a multi-user storage environment that is most suitable for unstructured, publicly accessible data.

b. Private cloud storage services provide a dedicated environment protected behind a service provider's organizational firewall. Private clouds are appropriate for users who need customization capability and more control over their data.

c. Hybrid cloud storage is a combination of the two models that includes at least one private cloud and one public cloud infrastructure.

The inventive hybrid cloud storage system and method might, for example, store actively used and structured data in a public cloud for easy access via a communication link using a decoded QR code URL and confidential and archival data in a private cloud that is password protected or uses additional security for access and retrieval. The inventive hybrid cloud storage system and method is scalable to suit current and future needs, accessible from anywhere Internet access is available and independent of the operating system and software of the user's computing device.

The intended focus is on cloud computing storage and retrieval technology rather than the direct use of computer hardware infrastructure and operating system platforms. Once the files are backed up online (in the cloud), there is no need for the user to carry their laptop or computer. The information is split up, then duplicated and stored across large networks of remote servers in many different locations, rather than residing on a single memory device or computer hard drive. That way, if one of the servers has a meltdown or power outage, each portion of the data is safe and can be retrieved from another location. When the files are needed, they can be downloaded remotely from any smart phone, iPad or other mobile computing device connected to a cellular telephone network, wireless computer network or near field communications network with internet access. The SSaaS system backup service technology will work quietly in the background, protecting all the individual files at all times using the latest in encryption and data storage technology, so if something does go wrong or a file is deleted by accident, the SSaaS system will still have a record available for a designated period of time. The SSaaS system can also offer cloud based file synchronization, allowing users to store and synchronize files online and between computers using cross-platform client servers between Windows, Mac, Linux, iOS, Android, Blackberry and Palm webOS.

Wireless Networks.

The wireless communication revolution is bringing fundamental changes to data networking and telecommunications. It is making cross-platform integrated networks a reality by freeing the user from any physical connection to the information. Personal communications networks, wireless LAN's, mobile radio networks and cellular systems provide the promise of fully distributed mobile computing and communications, any time, anywhere—24/7 worldwide! Telecommunications and the internet have gotten faster and remote data centers have multiplied, resulting in significantly lower service prices. Focusing on the networking and user aspects of the SSaaS system technology, can provide a global forum for archiving valuable data, documents, photos, videos and other information.

Infographic Symbols

"Infographics" or infographic symbols are two dimensional barcodes that have been around for more than twenty years and widely used throughout Japan and much of Europe. With the increased adoption of smart phones and other mobile computing devices, their use is dramatically increasing in the U.S. Recently, QR codes have been popping up practically everywhere. They typically look like little black-and-white puzzles or game boards, but they can also be created in color. They are being used as marketing and sales tools for businesses, labeling, and advertising of all types. They are easy to view; the user can simply point a smart phone or other mobile computing device toward the code and take a picture. Instantly, the device creates a connection to a website which can provide abundant data, graphics or video information, without the need to write anything down or type in URLs.

Figure 1:
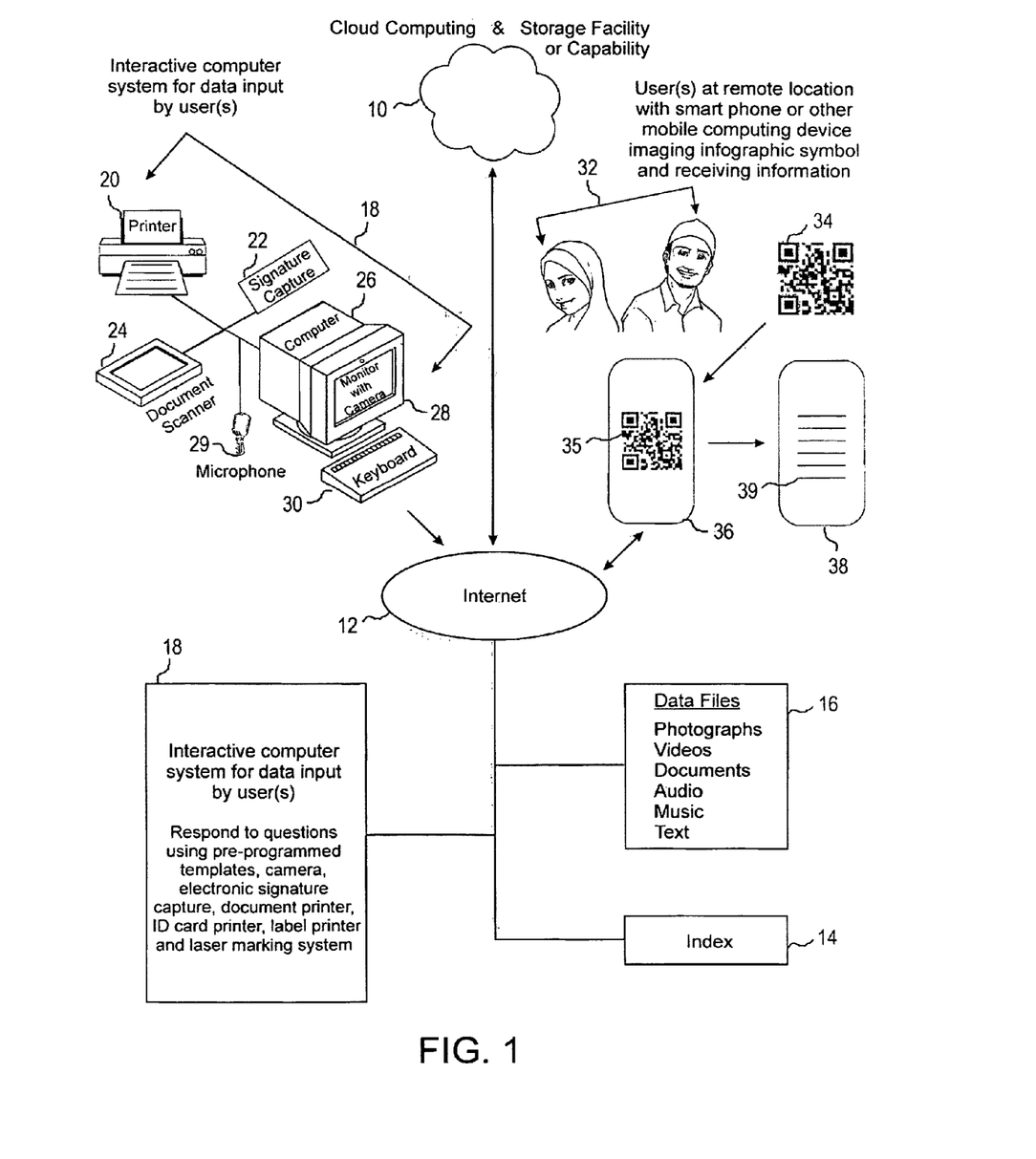
FIG. 1 is a block diagram of the system and method of this invention showing an interactive computer system allowing a user to input data of various types into the cloud storage facility or capability with the ability for said computer system to display or print the data and infographic symbol, to capture the signature of the user and to enable the imaging of the infographic symbol at a remote location using a smart phone or other mobile computing device.
Figure 2A:
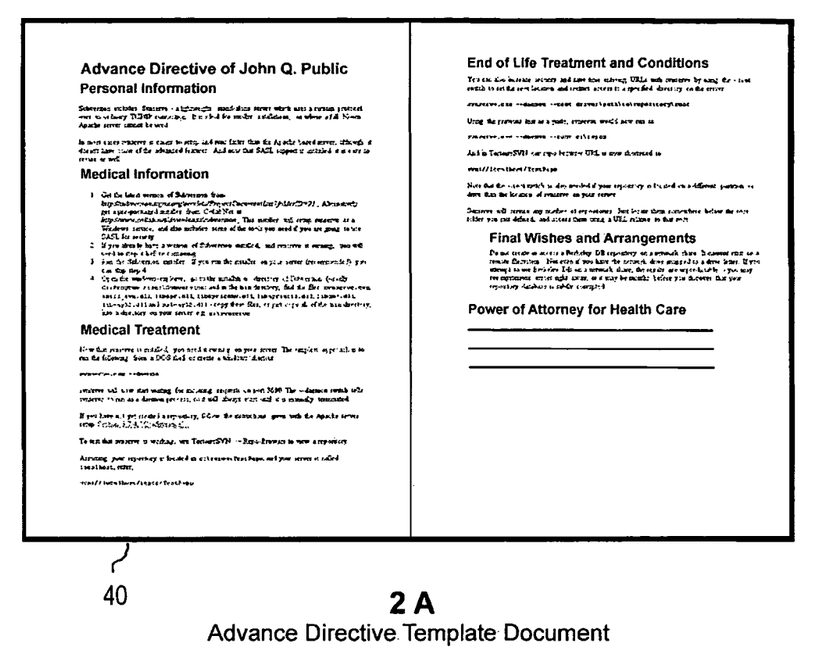
FIG. 2 is an illustration showing simplified views of an advance directive document, an ID card and an adhesive label which can be produced by the interactive computer system.
Figure 2B:
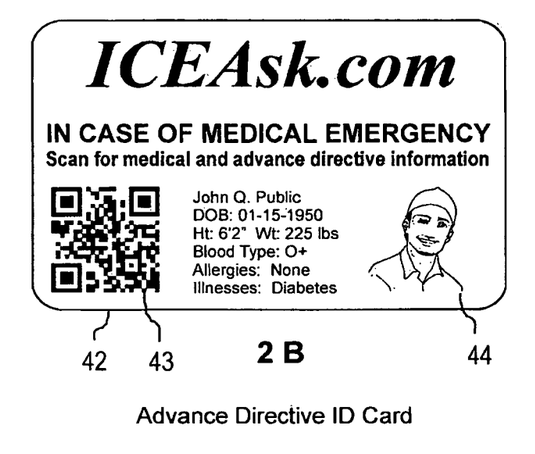
Figure 2C:
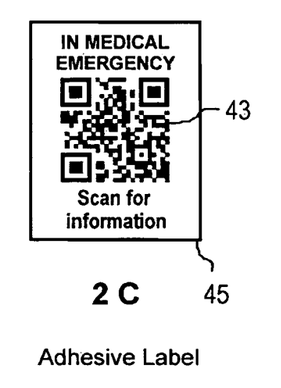

One embodiment as shown in FIG. 1 comprises an interactive computer system 18 connected to the Internet 12 and preferably equipped with a monitor 28 with integrated camera and microphone 29, whereby an individual is presented with a series of pre-programmed, template based, personal and healthcare related questions by the interactive computer system 18 and personally responds by verbal, touch screen or keyboard (30) entry system or selects a response from a multiple choice list of potential responses to such questions related to the information requested including, but not limited to, height, weight, hair color, eye color, blood type, allergies, medications, current medical conditions, medical treatment and life support procedures the individual does or does not want, past illnesses and/or surgeries, primary physician, primary healthcare facility, medical insurance information and the like. A healthcare power of attorney can be entered, designating the person or persons identified as the individual's healthcare agent, proxy or surrogate to make healthcare decisions on said individual's behalf in the event that said individual is unable to make such healthcare decisions independently, as well as the circumstances under which such authority shall become effective. Automatic email and telephone notification can be provided in the event that said information is accessed, as well as prompting from the system to acquire a "head shot" photograph of the individual for visual identification purposes to be included within the documentation and for any other relevant information the individual may wish to include. Upon completion of the collection and input of the information and photograph into the computer 26, the interactive computer system 18 creates an individualized and legally binding advance directive document 40 as shown in FIG. 2A and a personal ID card 42 containing the name, address, physical description and picture 44 of the individual and the infographic symbol 43 as shown in FIG. 2B, which should be preferably kept in the individual's wallet next to his or her driver's license. The system then displays and/or prints these documents (using printer 20) for the purpose of electronic signature capture 22 or physical signature of the individual and any witnesses required. In addition, durable adhesive labels 45, as shown in FIG. 2C, can be produced comprising the infographic symbol 43. These labels should be affixed to various types of the individual's personal items such as a refrigerator, bicycle, motorcycle or helmet, among many others.

The resulting advance directive document 40 will be formatted to comply with state and federal laws and would also comprise a general legal and HIPAA medical release in compliance with said applicable state and federal laws permitting the capture of an image of the infographic symbol 43 on the ID card 42 or label 45 by any of the previously described portable communications devices 36 and the extraction and transmission of the data contained in the infographic symbol allowing, under state and federal laws, for specific access to the individually and personally selected and collected healthcare related information for subsequent retrieval and display, utilizing a user friendly graphical interface in an easily readable format, for use by medical personnel or first responders at a remote location in the event of a medical emergency involving the cardholder.

The ID card 42 should be similar in size and shape to a bank credit or debit card and made from a plastic or metal material able to withstand the highest ambient temperatures allowing for human survival, in order to insure the integrity and accuracy of the information and infographic symbol 43 contained therein and made as durable as possible, while still remaining flexible. Such plastic materials include, but are not limited to, Polyimide, Polyethylene Terephthalate, Polysulfone, Polyoxymethylene, Polytetrafluoroethylene and Polybenzimidazole. In addition, these plastics should be white or of light color and comprise laser marking additives from sources referred to above, such as Mark It™, Lazerilair® or Micabs®, among others, to facilitate the laser inscribing or marking of permanent, high contrast, high resolution data, photographic images and symbols. Flexible sheet metal materials such as aluminum, steel and various alloys such as stainless steel can be used, making the card as durable as the standard military ID tags. The ID cards 42 could be preprinted with color graphics to indicate affiliation with a particular healthcare organization prior to the laser inscribing or marking of the permanent, high contrast, high resolution data, photographic images 44 and infographic symbols 43.

Figure 3:
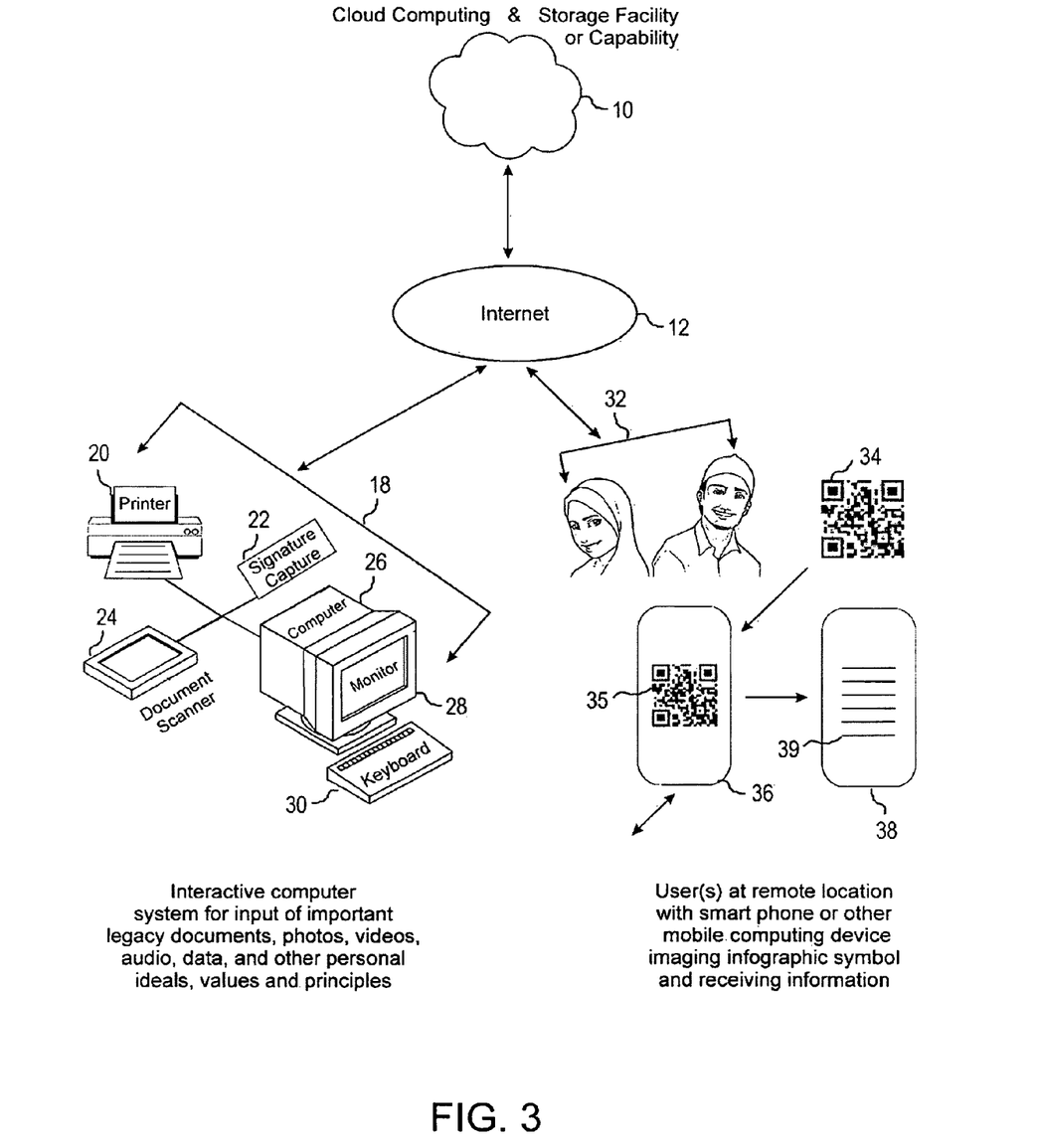
FIG. 3 is a block diagram of the system and method of this invention showing a user or group thereof retrieving important documents, photos, videos and other legacy information from storage at a remote location using a smart phone or other mobile computing device.
Figure 4:
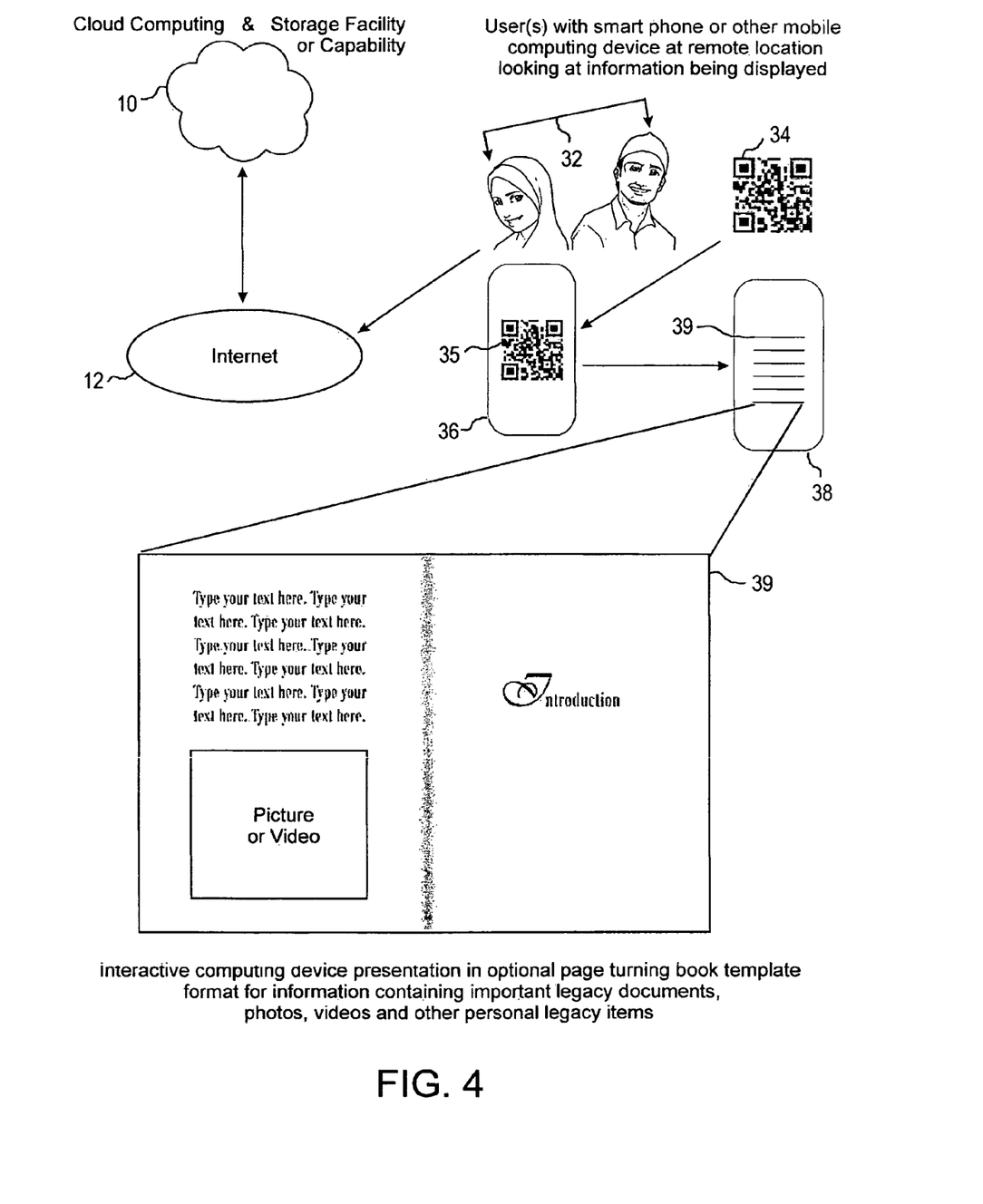
FIG. 4 is a block diagram of the system and method of this invention showing a user or group thereof retrieving and displaying important documents, photos, videos and other legacy information at a remote location using a smart phone or other mobile computing device.

In an additional embodiment shown in FIG. 3, the interactive computer system would also permit an individual to easily and quickly scan, create and store other critical legacy information, documents and files on the remote electronic memory storage facility or capability 10. The system would thus operate much like a virtual online safety deposit box for the secure storage and subsequent retrieval of such legacy information, with the option of additional security by password, biometric information or other technical protection. This additional information could include complete personal health records and medical images such as MRIs, X-rays and CAT scans; copies of legal documents such as living wills, insurance policies, trusts and deeds; images of financial documents such as stocks and bonds as well as photos, artworks and videos which have been scanned into the interactive, computer 18 utilizing the document scanner 24 and creating an index 14 and individual data files 16. In addition to family histories and photos, images of works of art created or owned by the enrolled individual(s) could be stored and displayed for the enjoyment of an entire family. These legacy assets would be converted into securely stored digital assets which could subsequently be accessed by imaging and decoding the generic infographic symbol 34 containing a unique uniform resource locator (URL) from any internet connected computer, smart phone or mobile computing device 35 enabling the legacy information to be downloaded from the cloud storage facility or capability 10 and displayed 39 on the smart phone or mobile computing device 38 as shown in FIG. 4 and/or printed using the laser printer system 20 by the individual user and/or his or her legal representative, utilizing the system's user friendly graphical interface in an easily readable format on a smart phone or mobile computing device 38, positioned at a remote location.

Figure 5:
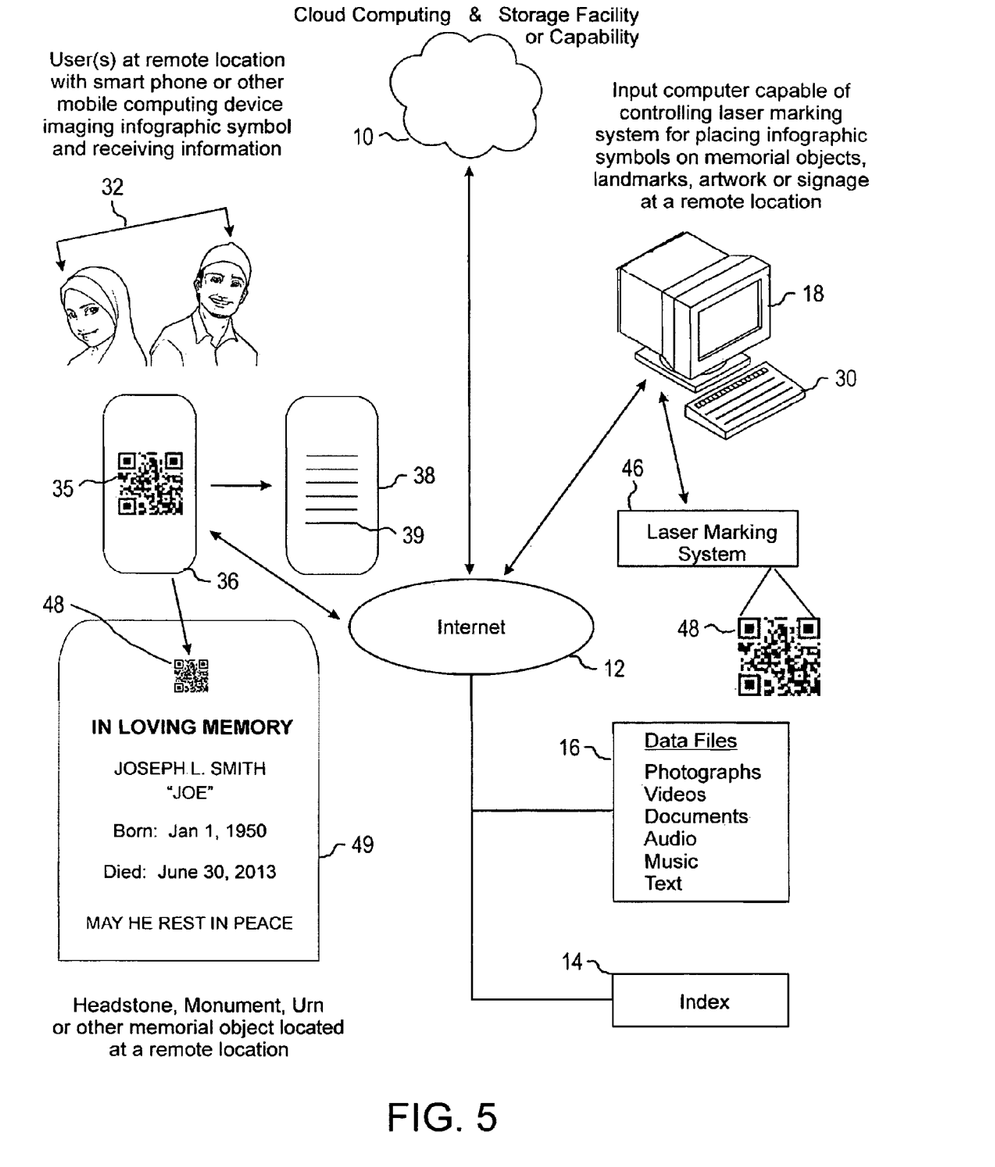
FIG. 5 is a block diagram of the system and method of this invention showing a laser marking system inscribing, marking or bonding a QR code and a user imaging the QR code on a memorial object and retrieving and displaying data from storage at a remote location using a smart phone or other mobile computing device.

In another embodiment as shown in FIG. 5, the interactive computer system 18 would also enable the placement of laser inscribed, marked or bonded infographic symbols 48 directly on the surface of a headstone 49, grave marker, mausoleum, cremation urn or other memorial object made from natural or engineered stone, metal, composite, glass and/or ceramic materials used to commemorate the life and death of a loved one or a beloved pet. Such symbols would facilitate the creation, transmission, storage and retrieval from the cloud storage facility or capability 10 of a digital audio, video and/or photographic presentation related to the specific person or pet comprising related dates and places of birth and death as well as other genealogy and lifetime achievement information; the capture of an image by a user 32 of the infographic symbol 48 on the memorial object by any of the previously described mobile computing devices 36; the decoding and transmission of the URL contained in the infographic symbol 48 allowing for specific access to the information for subsequent retrieval from the cloud storage facility or capability 10 and display by a user 32 of the information 39 on a smart phone or mobile computing device 38; positioned at a remote location and/or to be printed by a user 32 using the laser marking system 46. Such digital audio, video and/or photographic presentations could be completely original and unique or created conforming to templates and suggestions contained within the interactive computer system 18 and software and, furthermore, need not be purely memorial. These presentations could be commissioned during the lifetime of such person or pet to include interactive lifetime documentation and could be dynamic and updatable by friends, family and acquaintances;

evolving into everlasting memorials for viewing by future generations, as shown in FIG. 5.

Ceremonies and memorials have become an integral part of helping the living to cope with the deaths of friends, acquaintances and loved ones and while they are very important in modern day society, they do have several shortcomings. For instance, visitors have traditionally been required to be physically present at such ceremonies or memorials to view and reflect upon the lifetime and achievements of the deceased. Although modern day internet video has mitigated this situation somewhat, if a person is not physically present at the ceremonies or memorials and able to interact with others in attendance, he or she cannot fully share in the remembrances of those relationships and lifetime achievements and such full memories are then limited to those who actually attended. The placement of generic infographic symbols 34 in obituaries, announcements, commemorative mailings or other written communications would also allow the viewing of and possible interactive participation, via internet audio/video, in such ceremonies and memorials by persons or groups thereof positioned at remote locations, as also shown in FIG. 5.

Figure 6:
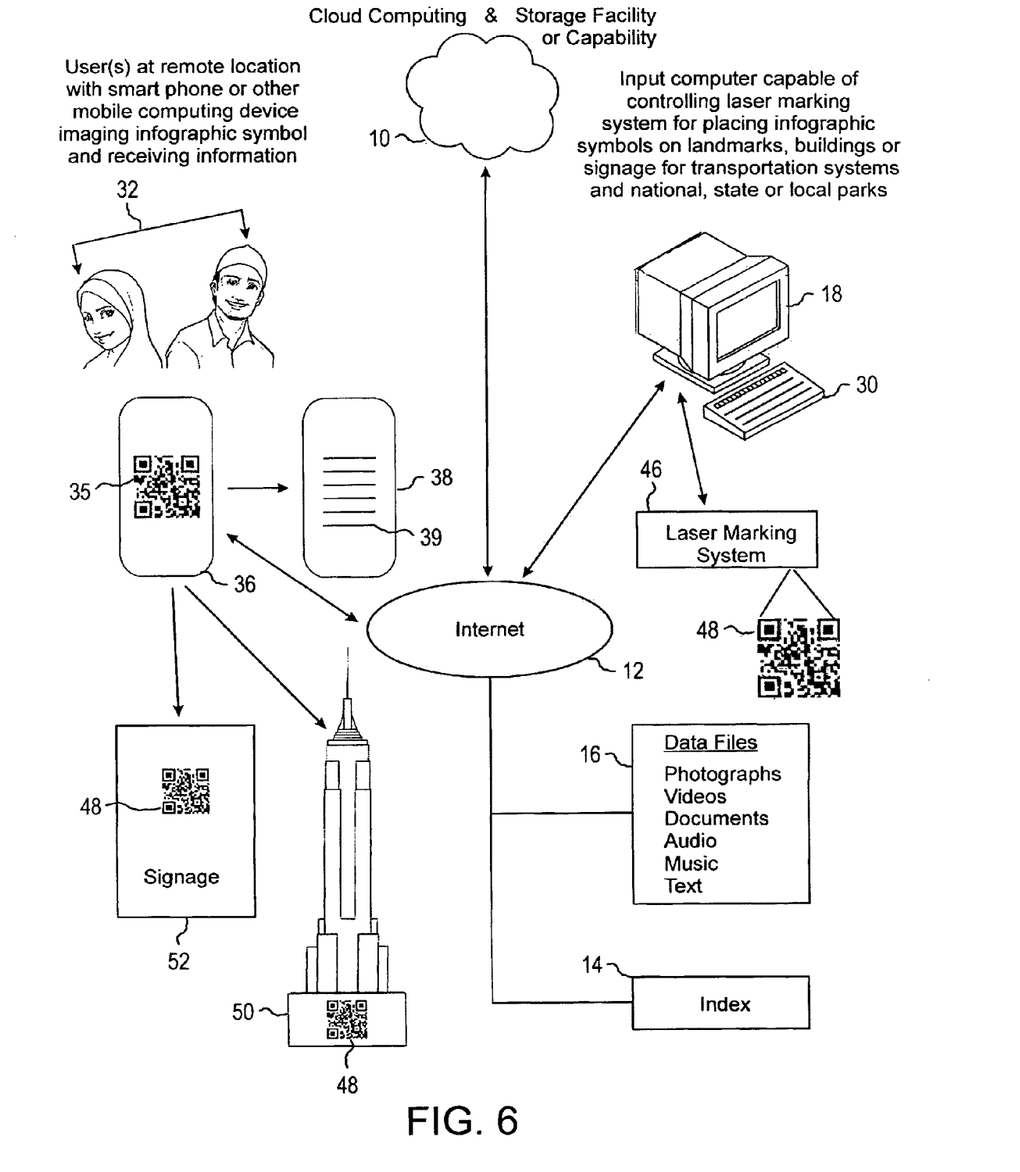
FIG. 6 is a block diagram of the system and method of this invention showing a laser marking system inscribing, marking or bonding a QR code and a user or group thereof imaging said QR code on a building or signage and retrieving and displaying data regarding the building or signage from storage at a remote location using a smart phone or other mobile computing device.

In another embodiment, the interactive computer system 18 would also enable the placement of laser inscribed, marked or bonded permanent infographic symbols 48 directly onto the surfaces of historical landmarks or buildings 50 or on signage 52 related to such historical landmarks or buildings 50 or in various locations within a transportation system or national, state or local park; the creation, transmission, storage and retrieval from the cloud storage facility or capability 10 of a digital audio, video and/or photographic presentation of the significant information and facts related to the specific object or thing on display; the capture of an image of laser inscribed, marked or bonded infographic symbols 48 on the related signage 52 by any of the previously described mobile computing devices 36; the decoding and transmission of the URL contained in the infographic symbol 48 allowing for the specific access to the information for subsequent retrieval from the cloud storage facility or capability 10 and display of said information 39, on the mobile computing device 38, utilizing the system's user friendly graphical interface in an easily readable format, by a user 32 positioned at a remote location, as shown in FIG. 6. An advantage of such systems is that a transportation system, landmark, building or park can be provided with information in multiple languages and updates as appropriate from time to time.

Figure 7:
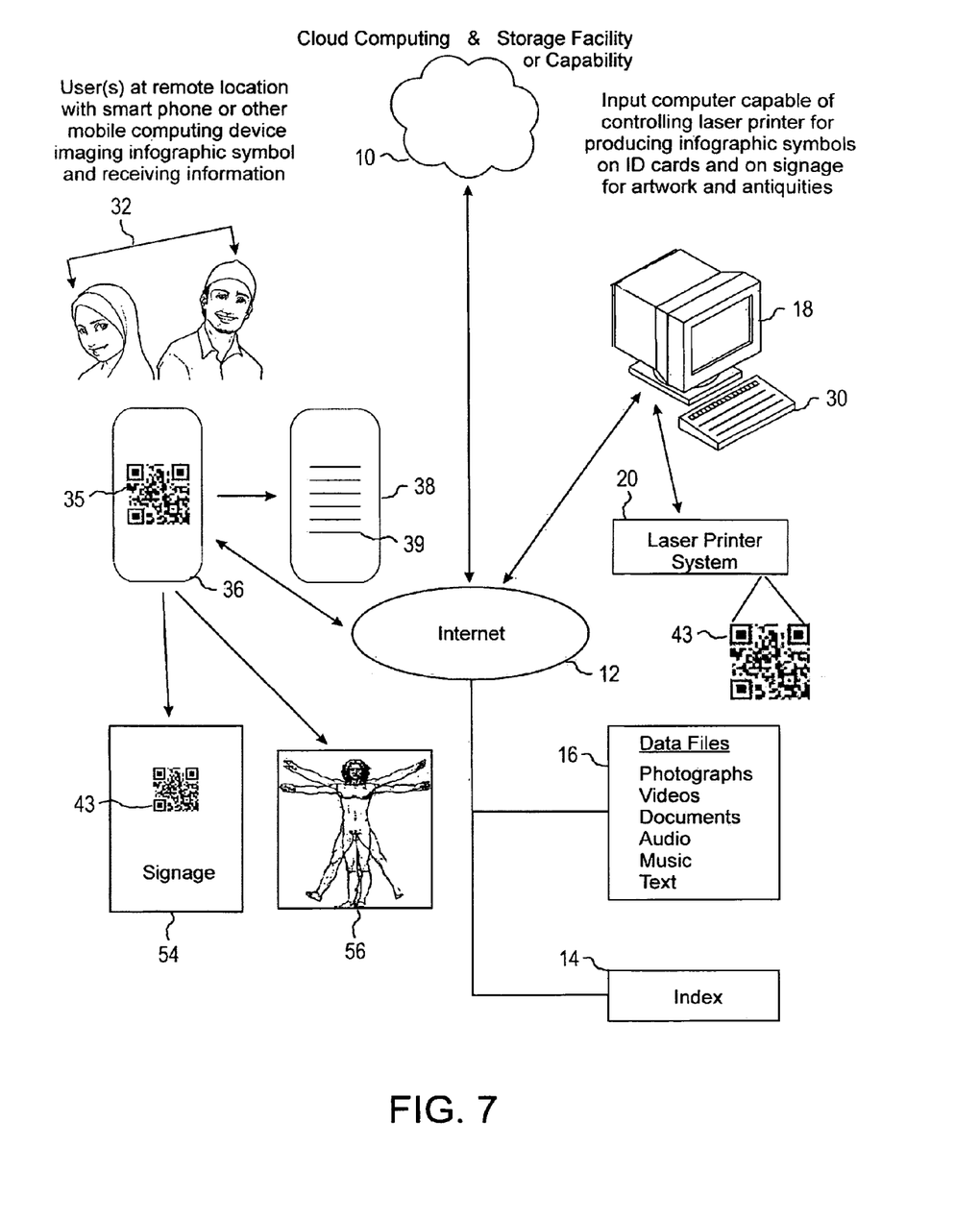
FIG. 7 is a block diagram of the system and method of this invention showing a laser printer system marking or bonding a QR code and a user imaging the QR code on signage and retrieving and displaying data regarding the signage at a remote location using a smart phone or other mobile computing device.

In another embodiment, as shown in FIG. 7, the interactive computer system 18 would also enable the placement of laser printed infographic symbols 43 on signage 54 related to artwork 56 at various locations within a museum, exhibition hall and/or other place of display; the creation, transmission, storage and retrieval from the cloud storage facility or capability 10 of a digital audio, video and/or photographic presentation of the significant information and facts related to the specific artwork or object on display 56; the capture of an image of printed infographic symbols 43 on the signage by any of the previously described mobile computing devices 36; the decoding and transmission of the URL contained in said infographic symbol 43 allowing for the specific access to the information for subsequent retrieval and display of said information 39 on the mobile computing device 38, utilizing the system's user friendly graphical interface in an easily readable format, by a user 32 positioned at a remote location within the museum, exhibition hall and/or other place of display. An advantage of such systems is that a museum, exhibition hall or other institution can provide information in multiple languages and update the information provided for specific items from time to time.

Figure 8:
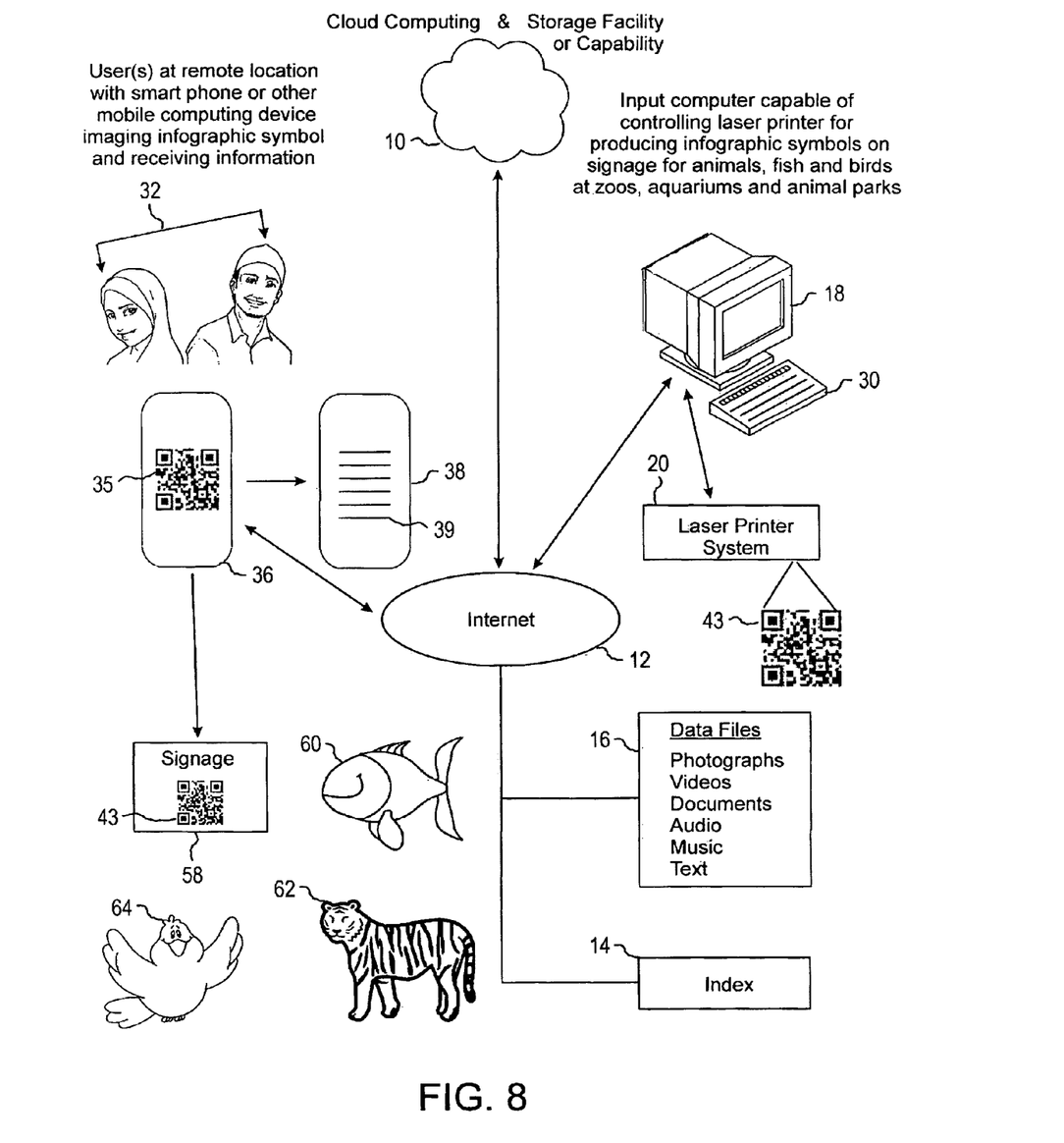
FIG. 8 is a block diagram of the system and method of this invention showing a laser printer system marking or bonding a QR code and a user imaging the QR code on signage and retrieving and displaying data regarding animals on display at a remote location using a smart phone or other mobile computing device.

In another embodiment, the interactive computer system 18 would also enable the placement of laser printed infographic symbols 43 on signage 58 related to fish 60, animals 62 and birds 64 at various locations within a zoo, wild animal park or aquarium; the creation, transmission, storage and retrieval from a cloud storage facility or capability 10 of a digital audio, video and/or photographic presentation of significant information and facts related to the specific fish 60, animals 62 and birds 64 on display; the capture of images of printed infographic symbols 43 on the signage 58 by any of the previously described mobile computing devices 36; the decoding and transmission of the URL contained in the symbol(s) allowing for the specific access to the information for subsequent retrieval and display of such information 39 on the mobile computing device 38, utilizing the system's user friendly graphical interface in an easily readable format, by a user 32 positioned within the zoo, animal park or aquarium and/or other place of display, as shown in FIG. 8. An advantage of such systems is that a zoo, aquarium or other institution can provide information in multiple languages and update the information provided for specific items from time to time.

Having described and disclosed my invention, I claim:

1. A system for the creation, transmission and storage of information and the subsequent retrieval of said information by a user, said system comprising:
   a. an interactive computer device with an operating system, connected to the Internet and including software adapted to perform functions comprising the creation, storage and retrieval of said information;
   b. an electronic memory storage facility or capability;
   c. an electronic communications link with said memory storage;
   d. an infographic symbol permanently inscribed on a substrate surface by the use of laser bonding technology.

2. The system of claim 1, further comprising a mobile computing device with camera adapted for imaging said infographic symbol and including software enabling said device to decode said infographic symbol upon imaging same.

3. The system of claim 2 wherein said mobile computing device is a smart phone, tablet computer or other mobile computing device adapted to establish a wireless communications link.

4. The system of claim 3 wherein the decoded infographic symbol and said software direct said mobile computing device to initiate a connection to a URL via said communications link to access and retrieve the information.

5. The system of claim 2 wherein said mobile computing device comprises a GUI for displaying information retrieved from said memory storage in a user selected format.

6. The system of claim 1 wherein said interactive computer is adapted to provide pre-formatted templates for the input of information.

7. The system of claim 1 wherein said infographic symbol is a barcode, data matrix code, QR code, or other machine readable one dimensional or two dimensional unique identification code.

8. The system of claim 7 wherein said infographic symbol is a QR code.

9. The system of claim 7 wherein said infographic symbol can be decoded by the operating system and installed software to cause said computing device to initiate a connection with the information utilizing the decoded URL directed to said memory storage via said electronic communication link.

10. The system of claim 1 wherein said laser bonding is conducted using bonding compositions comprising glass frits, mixed metal oxides or pigments or mixtures thereof.

11. The system of claim 1 wherein said laser bonding is conducted using bonding compositions comprising polyester resins, copolymers of styrene and acrylates or other monomers, pigments or combinations thereof.

12. The system of claim 1 wherein said memory storage facility is located at a site remote from said user.

13. The system of claim 1 wherein said substrate comprises a material selected from the group consisting of natural or engineered stone, metals, plastics, polymeric composites, glasses and ceramic materials.

14. The system of claim 13 wherein said substrate comprises a natural or engineered stone material.

15. A method of retrieving information about a person, animal, object or place wherein a user employs a mobile computing device with camera adapted to image and decode an infographic symbol permanently inscribed onto the surface of a substrate by the use of laser bonding technology related to said person, animal, object or place, causing said computing device to transmit a signal via a wireless electronic communications link using the unique URL associated with information stored in an electronic memory storage facility which results in the display of at least a portion of said information on the GUI of said computing device.

16. A method of storing information about a person, animal, object or place by loading said information into a memory storage facility associated with an interactive computer connected with the Internet, designating a URL uniquely associated with said information and permanently inscribing an infographic symbol onto the surface of an object associated with said person, animal, object or place, by using laser bonding technology wherein said infographic symbol can be imaged and decoded by using a mobile computing device with camera adapted to initiate a signal over an electronic communication channel to access said URL and the information associated therewith.

17. The method of claim 16 wherein said object is a tombstone or other monument, said infographic symbol is a bar code or QR code which is laser bonded onto the surface of the monument and the stored information accessed via said URL is identification and other information regarding at least one deceased person or animal associated with said monument.

18. The method of claim 16 wherein said infographic symbol is a bar code or QR code which is laser bonded onto the surface of an ID card or adhesive label and the stored information accessed via said URL comprises an advance directive and other medical or other healthcare information regarding a specific person associated with said information.

19. The method of claim 18 wherein said infographic symbol is laser inscribed into said ID card or adhesive label using at least one laser pigment additive.

20. In a system or method comprising an assembly of components including an interactive computer device with an operating system, connected to the Internet, an electronic memory storage facility or capability, an electronic communications link with said memory storage in which a user can employ a mobile computing device with camera adapted to image and decode an infographic symbol attached to or associated with a surface of an object and use a URL associated with information stored in a memory storage facility to retrieve information, the improvement comprising the use of laser bonding technology to permanently inscribe said infographic symbol directly onto said surface.

21. The improvement of claim 20 wherein the use of said laser bonding technology ensures that said infographic symbol will not become detached from said surface of said object, and said symbol is as permanent and durable as the surface of the object itself.

22. The improvement of claim 20 wherein said laser bonding is conducted using bonding compositions comprising glass frits, mixed metal oxides or mixtures thereof.

23. The improvement of claim 20 wherein said laser bonding is conducted using bonding compositions comprising polyester resins, copolymers of styrene and acrylates or other monomers, pigments or combinations thereof.

24. A method for the creation, transmission and storage of medical information about at least one person, comprising medical histories, advance directives and emergency instructions, comprising steps of providing a system having components:

a. an interactive computer device with an operating system, software adapted to perform functions comprising the creation and storage of said information, a camera, a microphone and at least one input system, connected to the Internet;

b. at least one laser printer and at least one monitor associated with said interactive computer device;

c. an electronic memory storage facility or capability;

d. an electronic communications link with said memory storage, and then entering said medical information said computer device via said input system; internally generating medical documents for each said person, including said advance directive and suitable information releases, and retaining all said information and documents in a designated file for each person;

generating a unique infographic symbol associated with each said person and laser printing said symbol, along with suitable personal information, on at least one ID card and at least one adhesive label; wherein said infographic symbol enables a user with a mobile computing device with a camera adapted for imaging and software adapted for decoding the imaged infographic symbol to decode said symbol, said computing device being further adapted to establish a wireless communications link and initiate a connection to a URL associated with said memory storage, to retrieve said information for at least one of said persons, then e. laser printing said infographic symbol and suitable personal information on at least one ID card and at least one adhesive label;

f. printing copies of said advance directive, releases and other requested medical information; and g. optionally, displaying the retrieved information on said monitor.

25. The method of claim 24 wherein said ID card is made of a durable plastic with said information laser printed thereon, and said infographic symbol is a QR code.

26. The method of claim 24 wherein said ID card is made of a flexible metal with said information inscribed thereon by laser bonding technology and said infographic symbol is a QR code.

* * * * *